United States Patent
Diorio et al.

(10) Patent No.: US 7,589,618 B2
(45) Date of Patent: *Sep. 15, 2009

(54) RFID READERS SYSTEMS AND METHODS FOR HOPPING AWAY FROM A FREQUENCY CHANNEL WITH RF INTERFERENCE

(76) Inventors: Christopher J. Diorio, 701 N. 34th St., Suite 300, Seattle, WA (US) 98103; Aanand Esterberg, 701 N. 34th St., Suite 300, Seattle, WA (US) 98103; Thomas G. Anderl, 701 N. 34th St., Suite 300, Seattle, WA (US) 98103; Scott A. Cooper, 701 N. 34th St., Suite 300, Seattle, WA (US) 98103

(*) Notice: Subject to any disclaimer, the term of this patent is extended or adjusted under 35 U.S.C. 154(b) by 0 days.

This patent is subject to a terminal disclaimer.

(21) Appl. No.: 11/849,804

(22) Filed: Sep. 4, 2007

(65) Prior Publication Data
US 2007/0296590 A1 Dec. 27, 2007

Related U.S. Application Data

(63) Continuation-in-part of application No. 11/412,172, filed on Apr. 25, 2006, now Pat. No. 7,391,329.

(60) Provisional application No. 60/842,809, filed on Sep. 7, 2006, provisional application No. 60/919,989, filed on Mar. 26, 2007.

(51) Int. Cl.
*H04Q 5/22* (2006.01)
*G08B 13/14* (2006.01)

(52) U.S. Cl. .................. 340/10.2; 340/572.2; 340/10.1; 340/10.3; 455/509; 455/63.1; 375/133; 375/132; 370/468; 370/329

(58) Field of Classification Search ................ 340/10.2, 340/572.2; 455/509, 63.1; 375/133, 132; 370/468, 329
See application file for complete search history.

(56) References Cited

U.S. PATENT DOCUMENTS

| | | | | |
|---|---|---|---|---|
| 5,471,469 A | * | 11/1995 | Flammer et al. | 370/346 |
| 5,828,693 A | * | 10/1998 | Mays et al. | 375/136 |
| 6,246,713 B1 | * | 6/2001 | Mattisson | 375/132 |
| 6,934,316 B2 | * | 8/2005 | Cornwall et al. | 375/134 |
| 7,009,515 B2 | * | 3/2006 | Carrender | 340/572.1 |
| 2007/0206705 A1 | | 9/2007 | Stewart | 375/316 |

FOREIGN PATENT DOCUMENTS

WO WO 2008/030471 A2 3/2008

* cited by examiner

*Primary Examiner*—Brian A Zimmerman
*Assistant Examiner*—Nam V Nguyen
(74) *Attorney, Agent, or Firm*—Turk IP Law, LLC

(57) ABSTRACT

RFID readers, systems, and methods are provided for overcoming the effects of RF interference. While a system is communicating in a channel, RF interference is monitored. If it is low, then the next channel to be hopped onto is chosen in an unbiased manner. But if interference is high, then the next channel to be hopped onto is chosen in a biased manner that disfavors at least one channel over another, in view of the detected interference. The choice of the next channel can thus result in diminishing communication in channels with a lot of RF interference.

45 Claims, 8 Drawing Sheets

RFID SYSTEM

*RFID READER SYSTEM CONFIGURATION WITH OPTIONAL LOCAL AND REMOTE COMPONENTS*

*HELPING DETERMINE WHETHER OBJECTIONABLE INTERFERENCE HAS BEEN DETECTED*

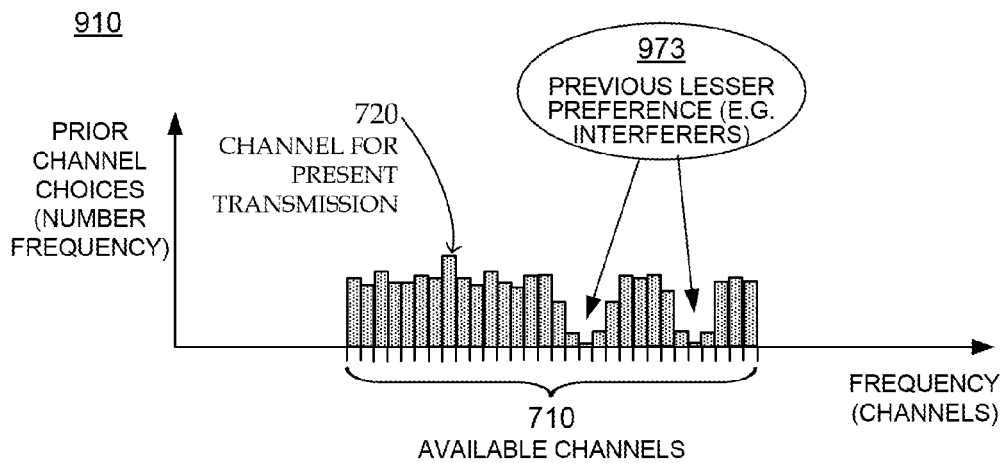
FIG. 9A   *HISTORY OF CHANNEL CHOICES*
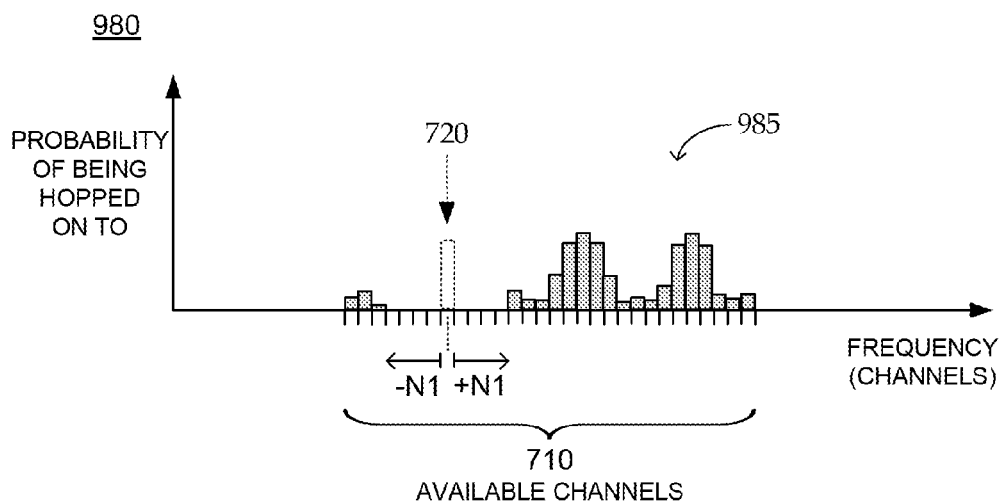
FIG. 9B   *COMPENSATING CHOICE OF NEXT CHANNEL TO HOP TO, IN VIEW OF HISTORY*

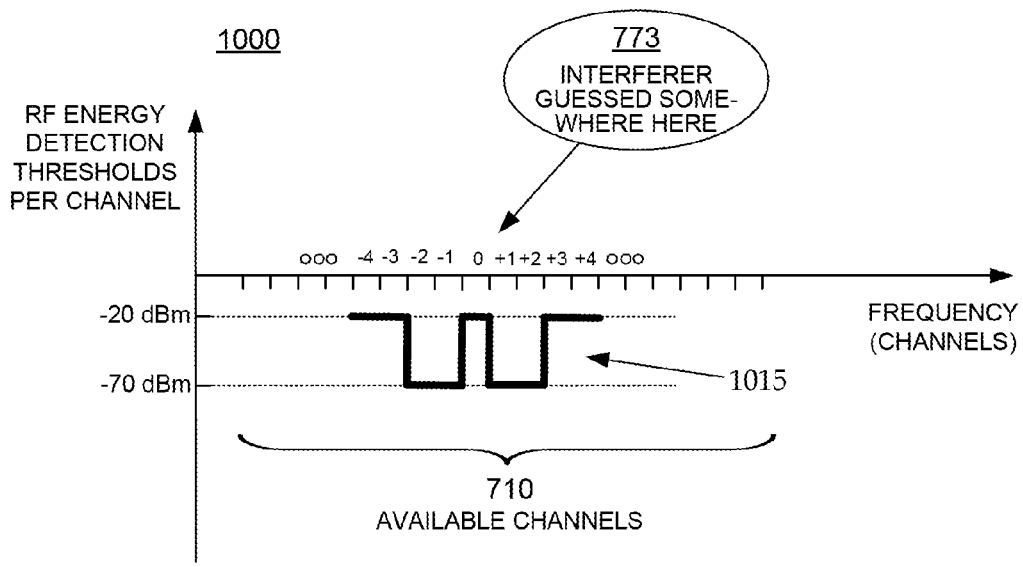
FIG. 10  *ATTEMPTING TO DETECT THE INTERFERER'S SPECIFIC CHANNEL*
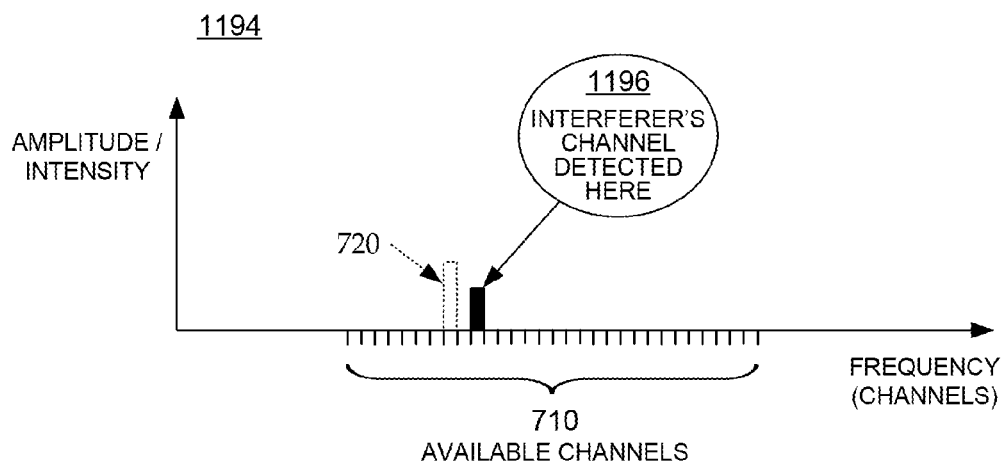
FIG. 11  *DETECTED INTERFERER'S CHANNEL*

RFID READERS SYSTEMS AND METHODS FOR HOPPING AWAY FROM A FREQUENCY CHANNEL WITH RF INTERFERENCE

CROSS REFERENCE TO RELATED APPLICATIONS

This application claims priority from U.S. Provisional Application No. 60/842,809, filed on 2006 Sep. 7, the disclosure of which is hereby incorporated by reference for all purposes.

This application claims priority from U.S. Provisional Application No. 60/919,989, filed on 2007 Mar. 26, the disclosure of which is hereby incorporated by reference for all purposes.

This application is a Continuation-In-Part of U.S. patent Ser. No. 11/412,172, now 7,391,329, filed 2006 Apr. 25, entitled "PERFORMANCE DRIVEN ADJUSTMENT OF RFID WAVEFORM SHAPE", and commonly assigned herewith.

This application may be found to be related to another application, filed on the same date as the present application, entitled "RFID READERS, SYSTEMS AND METHODS FOR EARLY HOPPING OUT OF A FREQUENCY CHANNEL IN THE PRESENCE OF RF INTERFERENCE". Ser. No. 11/849,737.

FIELD OF THE INVENTION

The present description addresses the field of Radio Frequency IDentification (RFID) systems, and more specifically to RFID reader systems, devices and methods for overcoming the effects of RF interference.

BACKGROUND

Radio Frequency IDentification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a radio section, a power management section, and frequently a logical section, a memory, or both. In earlier RFID tags, the power management section included an energy storage device, such as a battery. RFID tags with an energy storage device are known as active tags. Advances in semiconductor technology have miniaturized the electronics so much that an RFID tag can be powered solely by the RF signal it receives. Such RFID tags do not include an energy storage device, and are called passive tags.

A problem in RFID communication arises from RF interference. Such occurs from other RF sources, but is received by RFID readers and RFID tags, resulting in errors.

BRIEF SUMMARY

The invention improves over the prior art.

Briefly, the present invention provides RFID readers, systems, and methods for overcoming the effects of RF interference. While a system is communicating in a channel, RF interference is monitored. If it is low, then the next channel to be hopped onto is chosen in an unbiased manner. But if interference is high, then the next channel to be hopped onto is chosen in a biased manner that disfavors at least one channel over another, in view of the detected interference.

The choice of the next channel can thus result in diminishing communication in channels with a lot of RF interference. This results in improved system performance.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which:

FIG. 9A is a diagram showing a history of chosen channels made by various embodiments.

FIG. 9B is a diagram showing how probabilities among the channels of FIG. 9A are determined.

FIG. 10 is a diagram for illustrating attempting to detect a specific interferer channel according to embodiments.

FIG. 11 is a diagram for illustrating an interferer channel detected interferer channel according embodiments.

DETAILED DESCRIPTION

Figure 1:
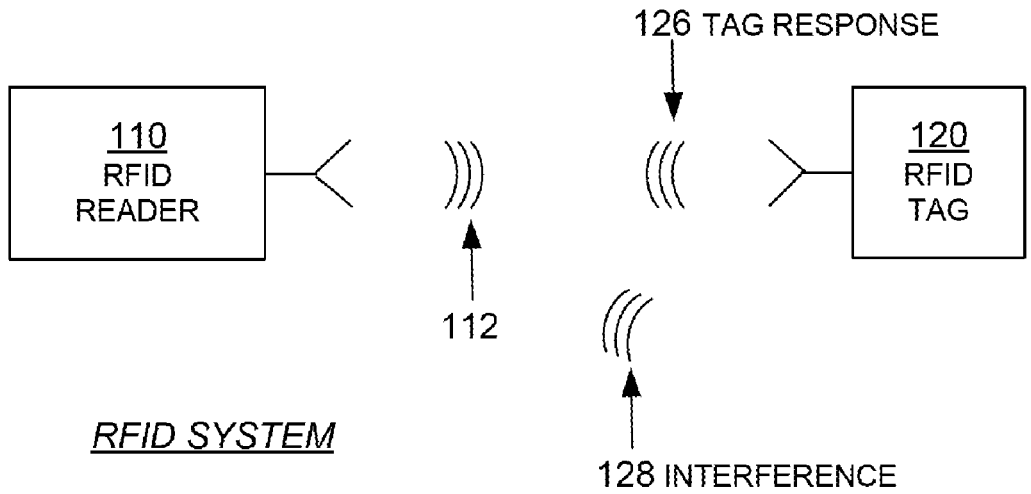
FIG. 1 is a block diagram of components of an RFID system.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment, an entirely firmware embodiment, or an embodiment combining aspects of the above. This description is, therefore, not to be taken in a limiting sense.

As has been mentioned, the present invention provides RFID readers, systems, and performance-based methods for overcoming the effects of RF interference. The invention is now described in more detail.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active tag, i.e. having its own power source. Where tag 120 is a passive tag, it is powered from wave 112.

In some instances, in addition to wave 126, RFID reader 110 also receives RF interference 128. This may be generated by other readers in the vicinity, and so on. Sometimes, interference 128 is detected, and in some instances it is determined to be objectionable, as per embodiments of the invention.

Figure 2:
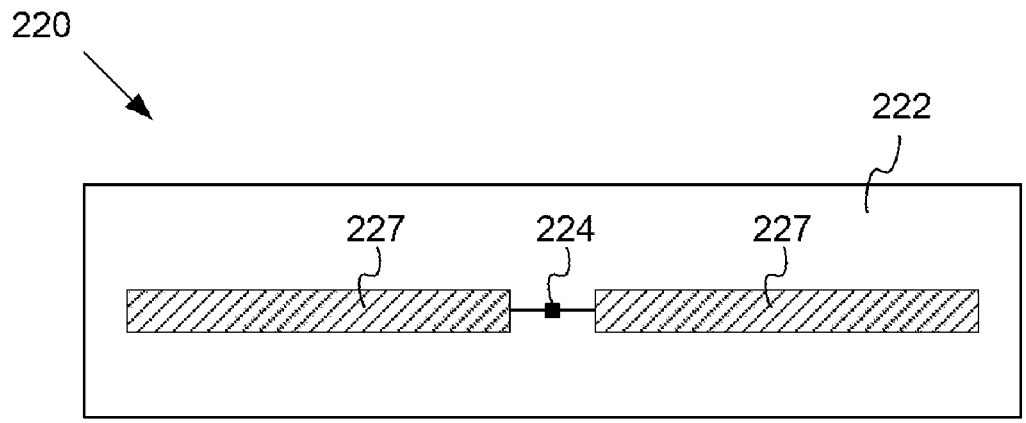
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different places of the segment can be coupled to one or more of the antenna ports of IC 224. For example, the antenna can form a single loop, with its ends coupled to the ports. When the single segment has more complex shapes, it should be remembered that, at the frequencies of RFID wireless communication, even a single segment could behave like multiple segments.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
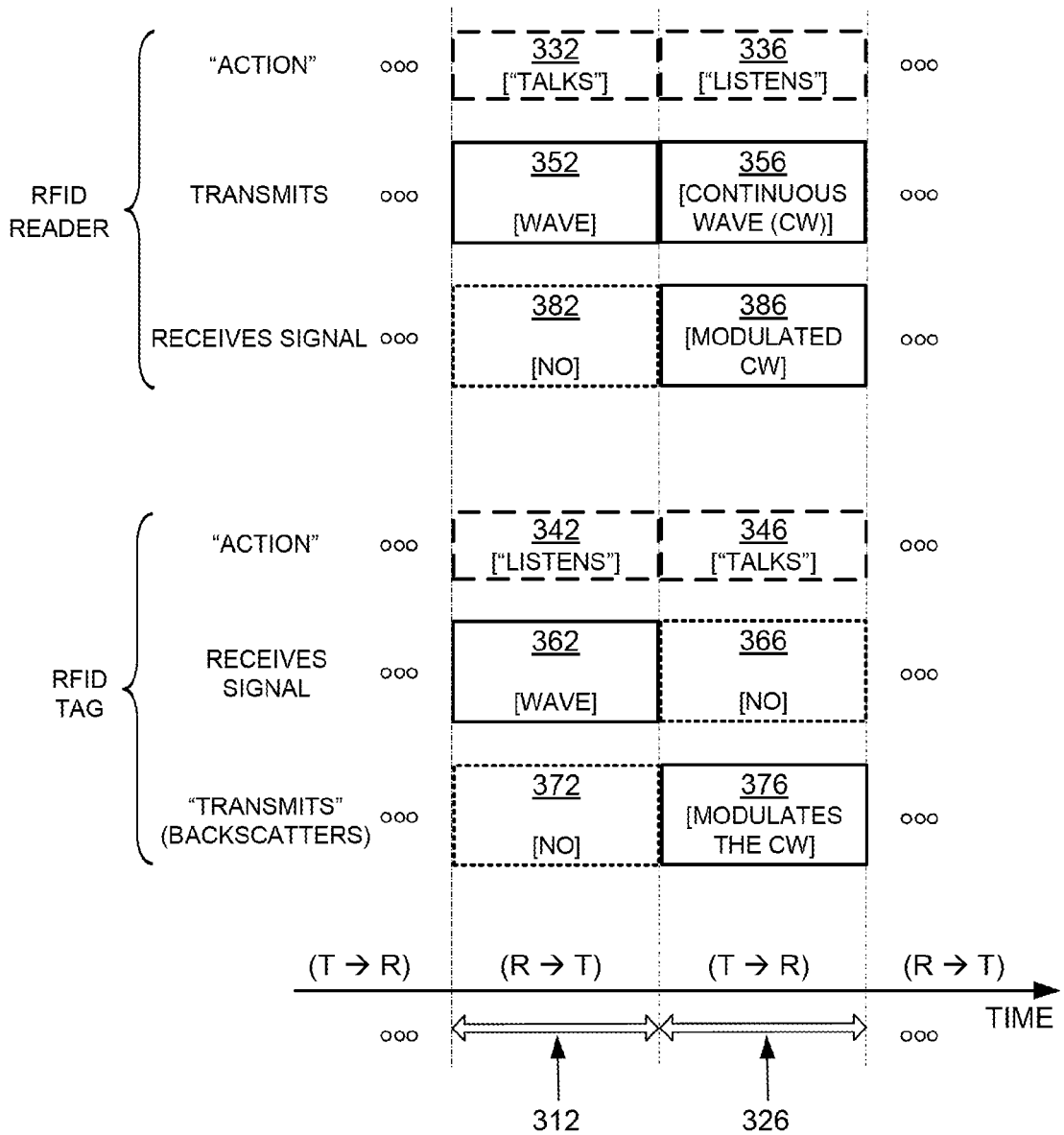
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are called protocols. A protocol is a specification that calls for specific manners of signaling between the reader and the tags.

One such protocol is called the Specification for RFID Air Interface—EPC (TM) Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO.

It was described above how reader 110 and tag 120 communicate in terms of time. In addition, communications between reader 110 and tag 120 may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

Reader 110 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel.

Tag 120 can respond with a backscatter that is modulated directly onto the frequency of the reader's emitted CW, also called baseband backscatter. Alternatively, tag 120 can respond with a backscatter that is modulated onto a frequency, developed by tag 120, that is different from the reader's emitted CW, and this modulated tag frequency is then impressed upon the reader's emitted CW. This second type of backscatter is called subcarrier backscatter. The subcarrier frequency can be within the reader's channel, can straddle the boundaries with the adjacent channel, or can be wholly outside the reader's channel.

A number of jurisdictions require a reader to hop to a new channel on a regular basis. When a reader hops to a new channel it may encounter RF energy there that could interfere with communications.

Embodiments of the present disclosure can be useful in different RFID environments, for example, in the deployment of RFID readers in sparse- or dense-reader environments, in environments with networked and disconnected readers such as where a hand-held reader may enter the field of networked readers, in environments with mobile readers, or in environments with other interference sources. It will be understood that the present embodiments are not limited to operation in the above environments, but may provide improved operation in such environments.

Figure 4:
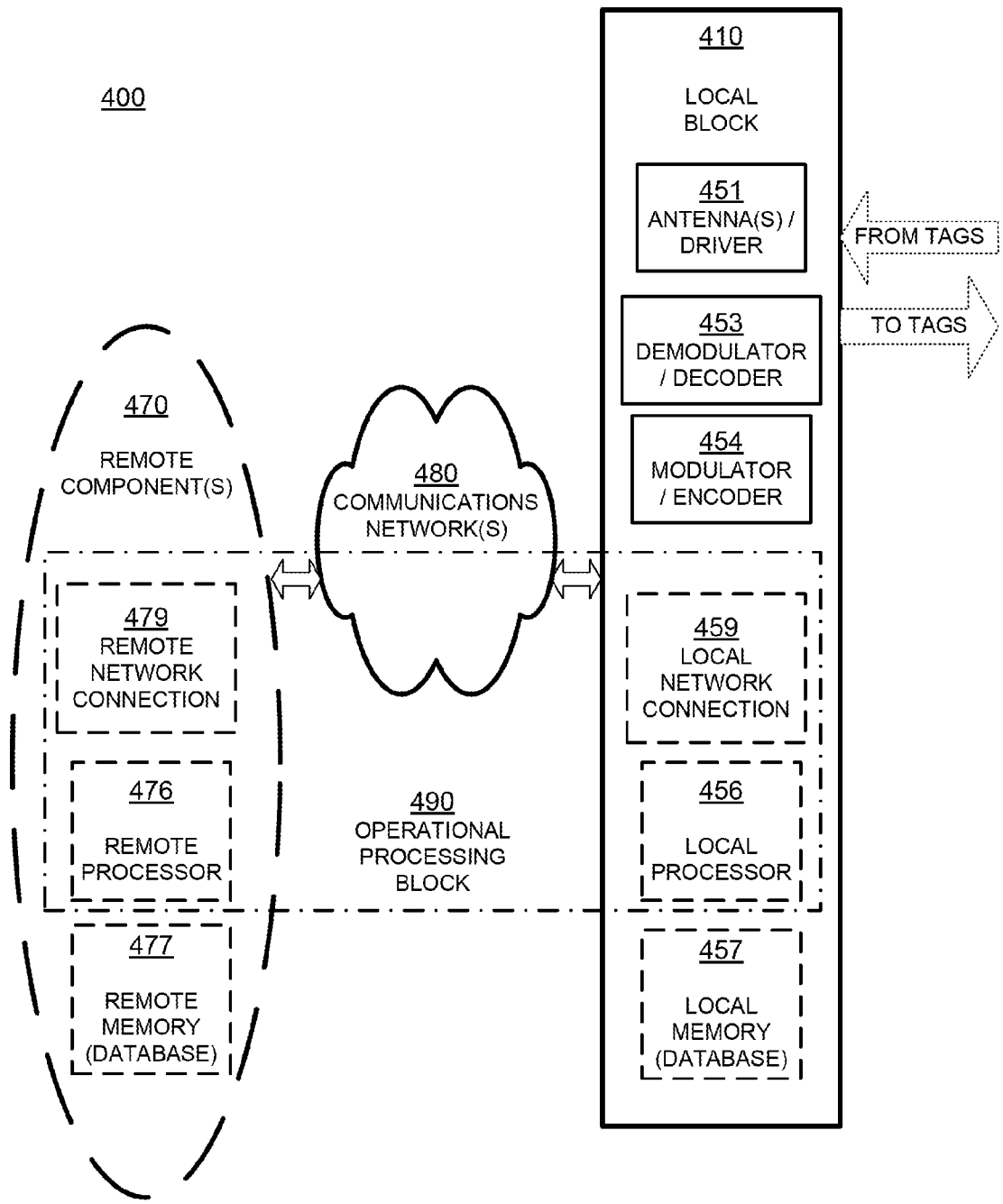
FIG. 4 is a block diagram of a whole RFID reader system according to embodiments.

FIG. 4 is a block diagram of a whole RFID reader system 400 according to embodiments. System 400 includes a local block 410, and optionally remote components 470. Local block 410 and remote components 470 can be implemented in any number of ways. It will be recognized that reader 110 of FIG. 1 is the same as local block 410, if remote components 470 are not provided. Alternately, reader 110 can be implemented instead by system 400, of which only the local block 410 is shown in FIG. 1.

Local block 410 is responsible for communicating with the tags. Local block 410 includes a block 451 of an antenna and a driver of the antenna for communicating with the tags. Some readers, like that shown in local block 410, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 453 demodulates and decodes backscattered waves received from the tags via antenna block 451. Modulator/encoder block 454 encodes and modulates an RF wave that is to be transmitted to the tags via antenna block 451.

Local block 410 additionally includes an optional local processor 456. Processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 453, the encoding function in block 454, or both, may be performed instead by processor 456.

Local block 410 additionally includes an optional local memory 457. Memory 457 may be implemented in any number of ways known in the art. Such ways include, by way of examples and not of limitation, nonvolatile memories (NVM), read-only memories (ROM), random access memories (RAM), any combination of one or more of these, and so on. Memory 457, if provided, can include programs for processor 456 to run, if provided.

In some embodiments, memory 457 stores data read from tags, or data to be written to tags, such as Electronic Product Codes (EPCs), Tag Identifiers (TIDs) and other data. Memory 457 can also include reference data that is to be compared to the EPC codes, instructions and/or rules for how to encode commands for the tags, modes for controlling antenna 451, and so on. In some of these embodiments, local memory 457 is provided as a database.

Some components of local block 410 typically treat the data as analog, such as the antenna/driver block 451. Other components such as memory 457 typically treat the data as digital. At some point there is a conversion between analog and digital. Based on where this conversion occurs, a whole reader may be characterized as "analog" or "digital", but most readers contain a mix of analog and digital functionality.

If remote components 470 are indeed provided, they are coupled to local block 410 via an electronic communications network 480. Network 480 can be a Local Area Network (LAN), a Metropolitan Area Network (MAN), a Wide Area Network (WAN), a network of networks such as the internet, and so on. In turn, local block 410 then includes a local network connection 459 for communicating with network 480.

There can be one or more remote component(s) 470. If more than one, they can be located at the same location, or in different locations. They can access each other and local block 410 via network 480, or via other similar networks, and so on. Accordingly, remote component(s) 470 can use respective remote network connections. Only one such remote network connection 479 is shown, which is similar to local network connection 459, etc.

Remote component(s) 470 can also include a remote processor 476. Processor 476 can be made in any way known in the art, such as was described with reference to local processor 456.

Remote component(s) 470 can also include a remote memory 477. Memory 477 can be made in any way known in the art, such as was described with reference to local memory 457. Memory 477 may include a local database, and a different database of a Standards Organization, such as one that can reference EPCs.

Of the above-described elements, it is advantageous to consider a combination of these components, designated as operational processing block 490. Block 490 includes those that are provided of the following: local processor 456, remote processor 476, local network connection 459, remote network connection 479, and by extension an applicable portion of network 480 that links connection 459 with connection 479. The portion can be dynamically changeable, etc. In addition, block 490 can receive and decode RF waves received via antenna 451, and cause antenna 451 to transmit RF waves according to what it has processed.

Block 490 includes either local processor 456, or remote processor 476, or both. If both are provided, remote processor 476 can be made such that it operates in a way complementary with that of local processor 456. In fact, the two can cooperate. It will be appreciated that block 490, as defined this way, is in communication with both local memory 457 and remote memory 477, if both are present.

Accordingly, block 490 is location agnostic, in that its functions can be implemented either by local processor 456, or by remote processor 476, or by a combination of both. Some of these functions are preferably implemented by local processor 456, and some by remote processor 476. Block 490 accesses local memory 457, or remote memory 477, or both for storing and/or retrieving data.

Reader system 400 operates by block 490 generating communications for RFID tags. These communications are ultimately transmitted by antenna block 451, with modulator/encoder block 454 encoding and modulating the information on an RF wave. Then data is received from the tags via antenna block 451, demodulated and decoded by demodulator/decoder block 453, and processed by processing block 490.

The invention also includes methods. Some are methods of operation of an RFID reader or RFID reader system. Others are methods for controlling an RFID reader or RFID reader system.

These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

An economy is achieved in the present document in that a single set of flowcharts is used to describe methods in and of themselves, along with operations of hardware and/or software and/or firmware, and so on. This is regardless of how each element is implemented.

Methods are now described more particularly according to embodiments.

Figure 5:
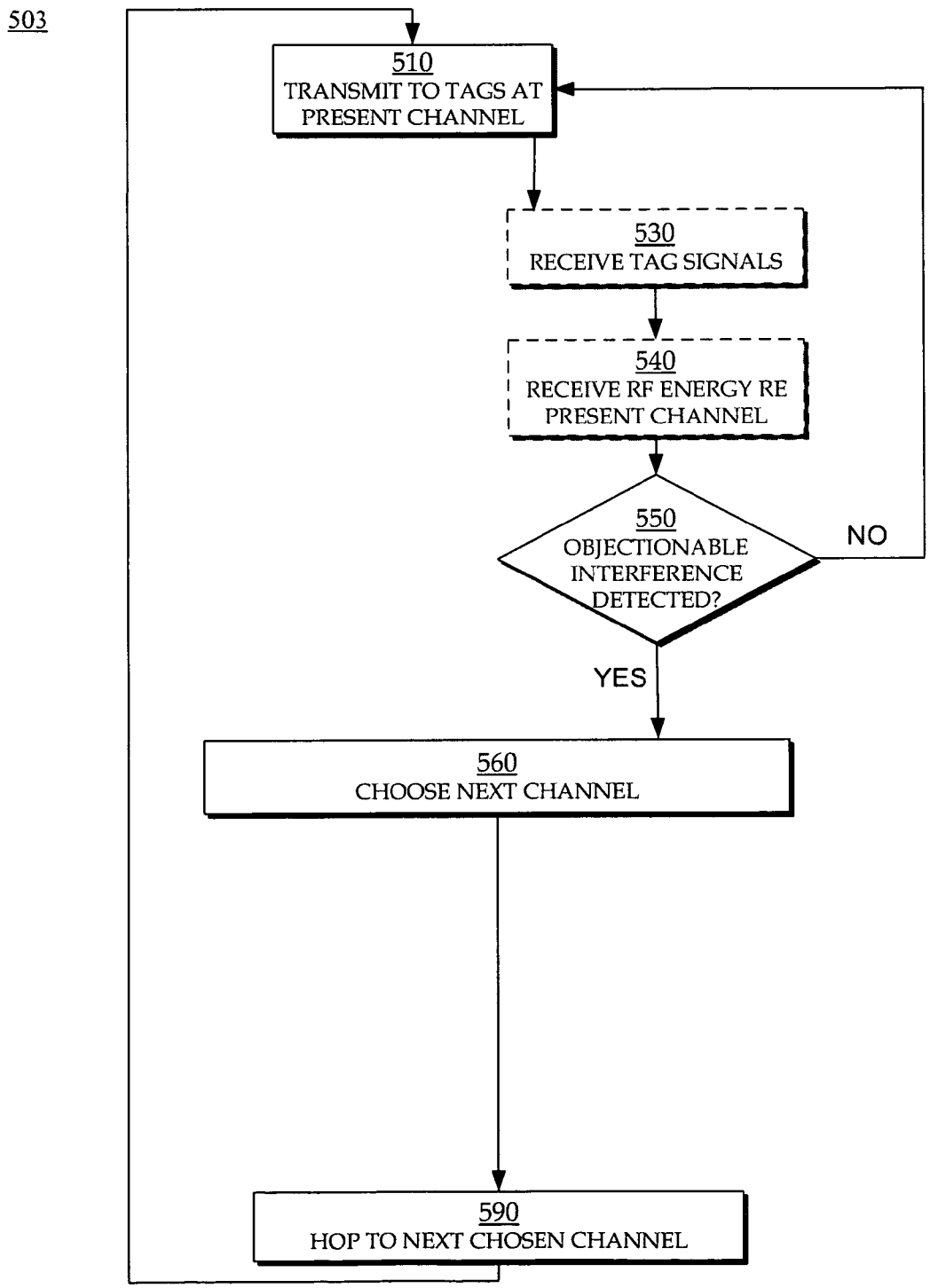
FIG. 5 is a flowchart for illustrating methods according to embodiments.

FIG. 5 is flowchart 503 illustrating a method according to an embodiment of the invention. The method of flowchart 503 is for communicating with RFID tags using the available communication channels, and may be practiced by different embodiments of the invention, including but not limited to RFID reader system 400, operational block 490, software according to embodiments, and so on.

At operation 510, a first wireless signal is transmitted to the RFID tags at a present channel. Transmission can be accomplished by causing a first wireless RF signal to be transmitted to the RFID tags via an antenna of an RFID reader system. This first wireless signal has a frequency carrier in the present channel, which is also called a first one of the available channels for purposes of when frequency hopping starts to be considered. Of course, a system could be hopping through many channels, and at some point in time, operation 510 would be at a channel considered the first or present channel.

According to an optional next operation 530, tag signals are received. These received tag signals are typically backscattered from the RFID tags in response to the first signal. When they are received by local block 410, there is an attempt to decode them, also by using error correction codes. This can be performed in a number of ways, for example as is described in copending U.S. patent application Ser. No.

11/388,235, published on 2006 Oct. 19 as document No. 2006/0236203, due to be assigned to the same assignee.

An optional next operation 540 is now described. Operation 540 is optional, in that it need not take place in every embodiment of the invention, although it is preferred. RF energy is received, which is associated with transmitting in the first channel. This RF energy could include the tag signals of operation 530, and also other energy such as noise and other signals, and will be elaborated on later in this document.

At a next operation 550, it is determined whether or not objectionable interference has been detected for communicating in the first channel of operation 510. This can be performed in any number of ways, and some exemplary such ways are described later in this document. As will be understood, the level of interference that is found objectionable can usually be set to optimize system performance. In addition, it can be adjusted in some embodiments, sometimes dynamically. For example, higher interference tolerance thresholds may be established where strong interference is detected in many of the available communication channels.

After operation 550, execution may return to operation 510, or proceed to operation 560. In some embodiments, execution always returns to operation 510, until there is an ordinary decision to hop to another channel. Such an ordinary decision may be arrived at in any number of ways.

One such way includes that a determination is made from decoded tag signals, of the type of signals that can be optionally received as described in operation 530 later in this document. From such tag signals it can be determined that an inventory round of the RFID tags is complete. Inventory rounds are discussed in U.S. patent application Ser. No. 11/210,384, published on 2005 Dec. 22 as Publication No. 2005/0280505A1, with one of many possible examples given in FIG. 9 of that document.

Another such way includes that a determination is made that the first signal has been transmitted for a first dwell time, which further approaches a preset limit dwell time for dwelling in a single channel continuously. Each system would have its own ways of so determining.

In other embodiments, if at operation 550 it is determined that objectionable interference has been detected, then execution may proceed to operation 560. In such embodiments, the ordinary decision will be bypassed. Upon determining that objectionable interference has been detected, in some embodiments the second signal is transmitted without transmitting any more signals in the first channel. In others, the first signal is continued to be transmitted for some time interval in the first channel, and then there is the hopping that is now described.

Per operation 560, a next or second one of the available channels is chosen, other than the first channel. The second channel can be chosen in an unbiased manner if it is determined that no objectionable interference has been detected at operation 550. This unbiased manner includes not favoring any channel over another so as to avoid any interference. The second channel is alternately chosen in a biased manner, which is different from the unbiased manner if it is determined that objectionable interference has been detected at operation 550. This biased manner includes disfavoring at least one channel over another in view of the detected interference. The biased and unbiased manners can be implemented in any number of ways. Some examples as to how this choice is made are described later in this document.

At a next operation 590, an RFID reader system can hop to the next channel chosen at operation 560. After that, execution can return to operation 510, and cause a second signal to be transmitted to the RFID tags, where the present channel will now be the second or next chosen channel. The second signal has a frequency carrier in the chosen second channel. Then there could be a repetition for the next hop, e.g. with determining whether subsequent objectionable interference is detected, etc. It will be understood that these full iterations of flowchart 503 can happen many times, as an RFID reader hops channels.

As mentioned above, at operation 550 it is determined whether or not objectionable interference has been detected. This determination can take place in any number of ways, for example using one or both of the tag signals received at operation 530, and the RF energy received at operation 540 if performed. Some examples are now described.

As mentioned above, at operation 550 it is determined whether or not objectionable interference has been detected. This determination can take place in any number of ways, for example using one or both of the tag signals received at operation 530, and the RF energy received at operation 540 if performed. Some examples are now described.

First, one can use whether a proper reply by the tags has been received in response to a command by a reader. For example, in the Gen2 Spec, certain commands mandate specific respective tag replies. The determination that the level of interference has become objectionable can be made if one or more of such expected specific tag replies not received, among the other tag signals that are received.

Second, one can use a quality metric of a tag signal. For example, a quality metric is computed in association with one or more of the received tag signals. Then it can be determined whether or not objectionable interference has been detected at least from the quality metric. The quality metric can measure any suitable attribute, such as a signal-to-noise ratio, or a measured signal from a decision threshold. The latter reflects a confidence in the decisions made using the threshold, for example as to whether a received waveform segment is really a "high" or a "low".

Third, one can use how well a preamble of a tag signal is matched, for example to an expected preamble. Many of the received tag signals start with a preamble, as is well known in the art. Mismatches are indicative of the presence of interference, and their extents are indicative of the level or amount of interference.

Accordingly, a tag preamble matching metric can be computed in association with one or more of the received tag signals. This metric can be computed in any number of ways, for example reflecting how well a preamble of one or more of the received tag signals matches an expected preamble. Then it can be determined whether or not objectionable interference has been detected from the tag preamble matching metric, either as computed, or further modified. For example, if the metric crosses a threshold the interference is deemed objectionable, and so on.

Moreover, one can use error rates to determine whether objectionable interference has been determined. Errors are indicative of the presence of interference, and their rates are indicative of the level or amount of interference. An example is now described.

Figure 6:
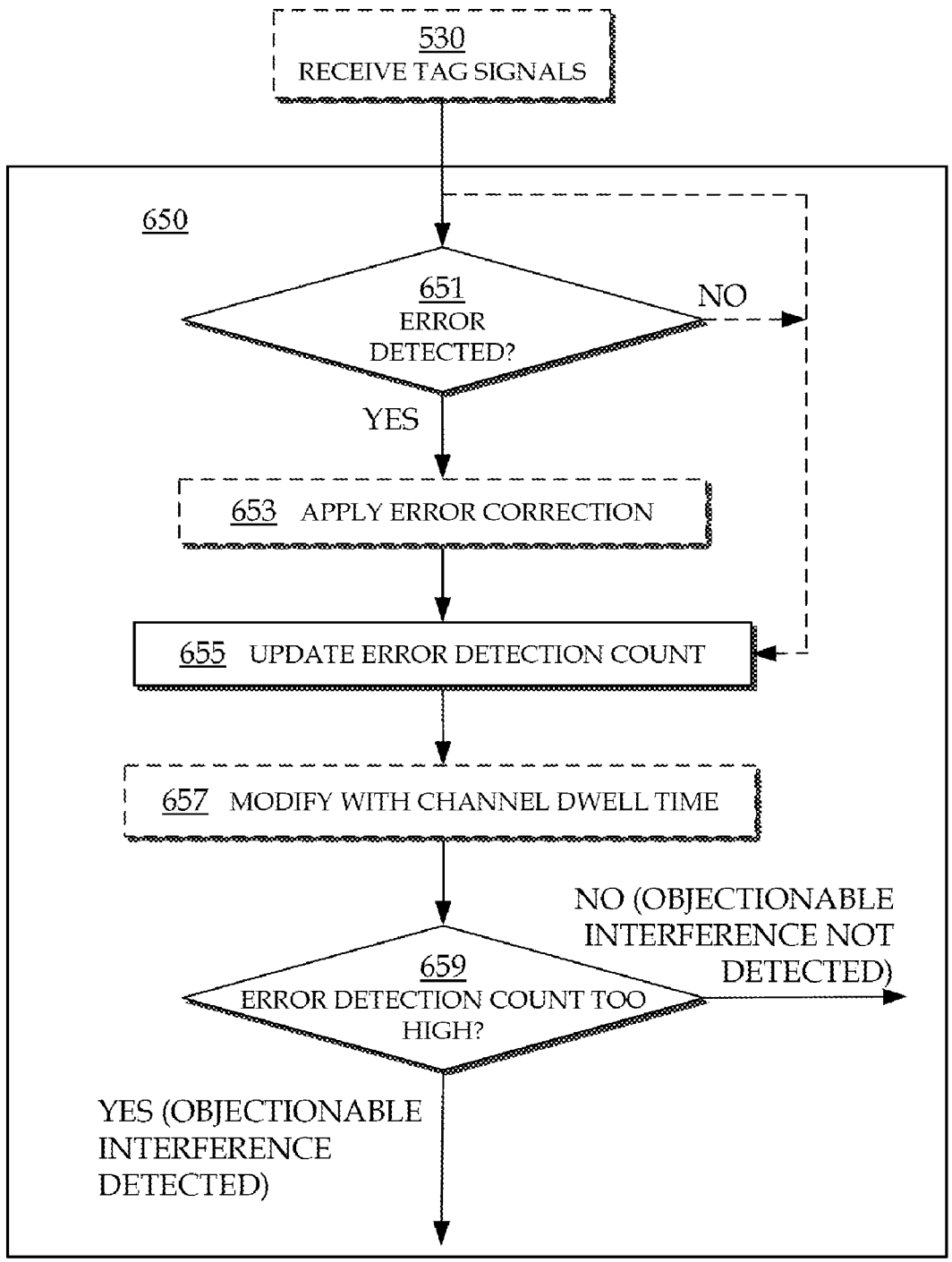
FIG. 6 is a flowchart for illustrating performing an operation of a method of FIG. 5.

FIG. 6 is flowchart 650 illustrating a method according to an embodiment of the invention. The method of flowchart 650 can be used for operation 550 of FIG. 5. The method of flowchart 650 may be practiced by different embodiments of the invention, including but not limited to RFID reader system 400, operational block 490, software according to embodiments, and so on.

At operation 651, it is determined whether an error has been detected in one of the received tag signals. This can be performed in any number of ways. A preferred way is by checking a Cyclic Redundancy Check (CRC) of the received tag signals. Such a CRC is included as a requirement by the Gen2 Spec, when the tag signals include Electronic Product Codes (EPCs). If an error has indeed been detected, at optional next operation 653, error correction is applied to fix the detected error.

If an error has indeed been detected at operation 651, then at a next operation 655 an error detection count is updated. The error detection count is a statistic that can be implemented in any number of ways. For example, the error detection count can be treated as just a number. Or it can be rendered as a ratio with a total number of the tag signals, for example by counting all the replies received at operation 530. Or, as per optional operation 657, the error detection count can be modified according to a channel dwell time.

At next operation 659, it is determined whether or not the detected interference is objectionable, at least from the error detection count. It will be understood that the method of flowchart 650 can be practiced many times, for updating the error detection count. So, at operation 651 for example, it is determined whether an error has been detected in more of the received tag signals. Operation 659 can be performed in a number of ways, which in turn depend on how the error detection count has been determined in the first place. Some such ways are now described.

Moreover, the determination of whether the level of interference is objectionable can be made from any RF energy received at operation 540. This energy can be received from any of the channels available for communicating with the RFID tags, e.g. all of them, only the present channel, or a group of them, such as a neighborhood of detected channels. In such cases, it can be determined that objectionable interference has been detected if the RF energy is larger than a first threshold, and that objectionable interference has not been detected otherwise. In the case of a neighborhood of detected channels, the neighborhood can have a suitable bandwidth, such as approximately 1.8 MHz around a center frequency of the first or present channel, and the first threshold can be about −70 dBm.

In addition, the determination of whether the level of interference is objectionable can be made from a combination of factors, including the above factors. For example, an aggregate score can be maintained, which is affected by one or more factors, like missing replies, quality metrics, tag preamble metrics, error counts, and received RF energy.

Returning briefly to FIG. 5, as already mentioned, a second one of the available channels is chosen per operation 560. The second channel can be chosen in any number of ways, as is now described in more detail.

Figure 7:
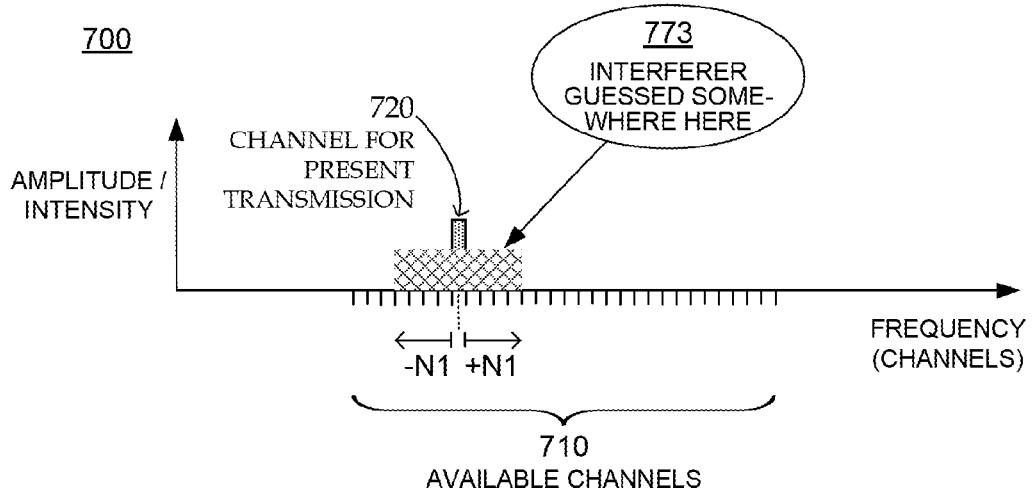
FIG. 7 is a diagram showing a spectrum of frequency channels available for transmitting, and a channel among them that is being used in an embodiment of a method of FIG. 5.

Referring to FIG. 7, a diagram 700 has horizontal axis that shows frequency, as it may have been divided in channels. The channels available for communication are shown as 710. Diagram 700 also has a vertical axis showing amplitude or intensity of transmission per channel. Channel 720 is the channel considered as the present channel of operation 510, the only one in which there is transmission.

According to a comment 773, the interferer has been guessed to be near present channel 720, or in a neighborhood around present channel 720. This neighborhood is not necessarily the same as was described above with reference to operation 540, although they are related.

In some instances, the neighborhood of FIG. 7 is described as the channels within a number N1 of present channel 720. It has been found that a good value for number N1 is 3 or 4, absent more information. Of course, the number N1 can be adjusted. Adjustment can be depending on what works for the system, and also depending on other factors, such as a history of detecting objectionable interference in an environment of the RFID tags.

In addition, if at operation 540, RF energy has been received, a size of the neighborhood of FIG. 7 can also be determined from a manner of receiving or detecting the RF energy, or the amount of received RF energy, or both. For example, if the total received RF energy is larger than a suitable threshold, the neighborhood has at least 11 channels, with N1 being equal to 5. Such a suitable threshold can be −20 dBm. For another example, if the total detected RF energy is less than a suitable threshold, the neighborhood has at least 7 channels, with N1 being equal to 3. Such a suitable threshold again can be −20 dBm.

Since the interferer has been guessed to be a neighborhood of present channel 720, it is optional but preferred that the second channel is chosen per operation 560 in a manner that disfavors all of the channels in the neighborhood. For example, the channels in the neighborhood could have much less chance of being chosen, than the remaining ones of the available channels. In some instances, they could have no chance of being so chosen, as illustrated in the following two examples.

Figure 8:
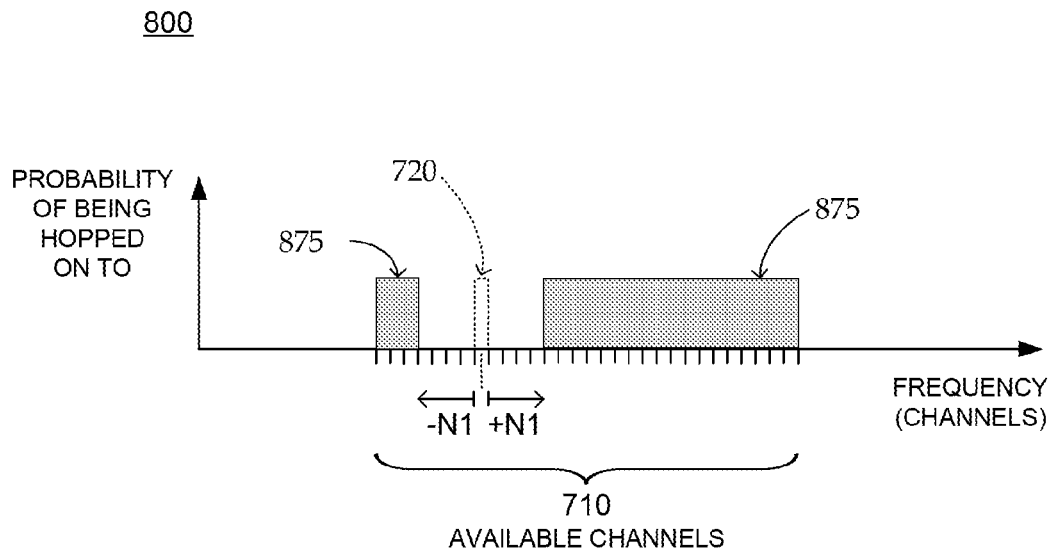
FIG. 8 is a diagram showing probabilities among the channels of FIG. 7 for being the next one to be hopped on to from the present one.

FIG. 8 is a diagram 800 that shows probabilities among the channels of FIG. 7 for being the next one to be hopped on to from channel 720. There is zero probability that the next channel will be 720. According to profiles 875, every one of the channels other than channel 720 has a substantially equal chance of being chosen as the second channel.

FIG. 8 shows what is also known as the neutral manner, and has to do with the fact that prior choices have made it so that all channels are being used with the same frequency. One way, for example, is to have hopping tables that always make enough of a hop, for example the next channel is always 5 or more channels away. In the second example below, compensation is performed.

FIG. 9A is a diagram 910 showing channels 710, and a history of which ones have been chosen in the past and how often, as a bar chart. It will be noted that, according to a comment 973, there are two regions that have been used with lesser preference than the others. Such can happen if there are interferers that are localized, i.e. don't hop channels themselves.

FIG. 9B is a diagram 980 showing how probabilities among the channels of FIG. 9A can be determined, so as to avoid the channels in the neighborhood of present channel 720, and so as to further compensate for the lesser preference. The probabilities are a bar chart 985, which are the complement of the bar chart of FIG. 9A. Thus, it favors heavily channels that are pointed out in comment 973.

A further distinction should be made here, namely that the lesser preference may be because of interferers that either hop channels, or are stationary. If they are stationary, the time to visit them preferentially is when tags are not detected, which can be further done with lesser transmitted power or even no power at all.

In some embodiments, an effort is made to detect one of the channels as the interferer's channel. In this case, the interferer could be an RFID reader operating according to the same channel scheme as shown in FIG. 7, and the RF interference would be ideally confined to a single channel.

Detection can be attempted in any number of ways. For example, RF energy can be received for measuring in individual channels, and the RF energy of neighboring channels can be contrasted. In some embodiments, for example, a certain channel can be detected as the interferer's channel if the certain channel has RF energy above a preset high threshold, while the energy in at least one of its neighboring channels are below a preset low threshold. An example is now described.

FIG. 10 is a diagram 1000 for illustrating attempting to detect a specific interferer channel according to embodiments. The horizontal axis is the same as in FIG. 7, showing the available channels. The vertical axis shows RF energy detection thresholds.

A pattern 1015 is used to detect the interferer's channel, which spans a neighborhood of 9 detected channels. It has a high threshold of −20 dBm, and a low threshold of −70 dBm, although different values can be used, and a different pattern can be used. Pattern 1015 is optimized for detecting the interferer's channel in the event the interferer is another RFID reader, as per the above.

Pattern 1015 can be applied in the neighborhood of comment 773. Its center channel (channel "0") can be at present channel 720, or at another channel near it. Ideally, pattern 1015 is swept, to detect the interferer. Sweeping is preferably near the neighborhood of present channel 720.

In some instances detection succeeds. FIG. 11 is a diagram 1194 for illustrating an interferer channel detected according embodiments. The interferer, unknown for FIG. 7, has now been located and is indicated by comment 1196.

In these instances, the second channel is chosen in such a way that a resulting tag backscatter avoids a center frequency of the interferer's channel. This can be accomplished in any number of ways. For example, the second channel can be chosen in a manner that disfavors all of the channels in a neighborhood of the interferer's channel. Or, the interferer's channel can be chosen as the second channel, and the RFID tags can be commanded to backscatter on the subcarrier instead of on the carrier.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. A Radio Frequency Identification (RFID) reader system for communicating with RFID tags using a plurality of communication channels, comprising:
an antenna; and
an operational processing block coupled to the antenna and operable to:
cause a first wireless signal to be transmitted via the antenna to the RFID tags, the first wireless signal having a frequency carrier in a first one of the channels;
determine whether or not objectionable interference has been detected based on one of a reply from at least one RFID tag and RF energy received in at least one of the channels available for communicating with the RFID tags;
choose a second one of the channels other than the first channel, the second channel being chosen in an unbiased manner if it is determined that no objectionable interference has been detected, the unbiased manner including not favoring any channel over another so as to avoid any interference, the second channel being alternately chosen in a biased manner different from the unbiased manner if it is determined that objectionable interference has been detected, the biased manner including disfavoring at least one channel over another in view of the detected interference; and
cause a second signal to be transmitted to the RFID tags, the second signal having a frequency carrier in the second channel.

2. The system of claim 1, in which
the second signal starts being transmitted immediately upon determining that objectionable interference has been detected.

3. The system of claim 1, in which
the first signal continues to be transmitted for a time interval before starting transmitting the second signal, after determining that objectionable interference has been detected.

4. The system of claim 1, in which the operational processing block is further operable to:
determine whether or not subsequent objectionable interference has been detected for communicating in the second channel;
choose a third one of the channels other than the second channel, the third channel being chosen in the unbiased manner if it is determined that no subsequent objectionable interference has been detected, and in the biased manner if it is determined that subsequent objectionable interference has been detected; and
cause a third signal to be transmitted to the RFID tags, the third signal having a frequency carrier in the third channel.

5. The system of claim 1, in which the operational processing block is further operable to:
receive tag signals from the RFID tags in response to the first signal; and
in which it is determined whether or not objectionable interference has been detected at least from the tag signals.

6. The system of claim 5, in which
the first signal includes a command that mandates a specific tag reply, and
it is determined whether or not objectionable interference has been detected at least from whether the tag signals include or not the specific tag reply.

7. The system of claim 5, in which
a quality metric is computed in association with one of the received tag signals, and
it is determined whether or not objectionable interference has been detected at least from the quality metric.

8. The system of claim 7, in which
the quality metric is a signal-to-noise ratio.

9. The system of claim 7, in which
the quality metric is a distance of a measured signal from a decision threshold.

10. The system of claim 5, in which
a tag preamble matching metric is computed in association with one of the received tag signals, and
it is determined whether or not objectionable interference has been detected at least from the tag preamble matching metric.

11. The system of claim 10, in which
the tag preamble matching metric is determined from how well a preamble of one of the received tag signals matches an expected preamble.

12. The system of claim 5, in which
it is determined whether an error has been detected in one of the received tag signals, an error detection count is updated if it is determined that the error has been so detected, and it is determined whether or not objectionable interference has been detected at least from the error detection count.

13. The system of claim 12, in which it is determined that objectionable interference has been detected if the error detection count exceeds a threshold, and that objectionable interference has not been detected otherwise.

14. The system of claim 12, in which the error detection count is rendered as a ratio with a total number of the tag signals.

15. The system of claim 1, in which the operational processing block is further operable to:

receive RF energy associated with transmitting in the first channel; and in which it is determined whether or not objectionable interference has been detected at least from the received RF energy.

16. The system of claim 15, in which the RF energy is received from all channels available for communicating with the RFID tags.

17. The system of claim 15, in which the RF energy is received only from the first channel.

18. The system of claim 15, in which the RF energy is received from a neighborhood of detected channels, and it is determined that objectionable interference has been detected if the RF energy is larger than a first threshold, and that objectionable interference has not been detected otherwise.

19. The system of claim 1, in which the biased manner includes choosing the second channel in a manner that disfavors all of the channels in a neighborhood of the first channel.

20. The system of claim 19, in which the neighborhood includes all channels within a number N1 of the first channel.

21. The system of claim 19, in which the operational processing block is further operable to:

detect RF energy associated with transmitting in the first channel; and in which it is determined whether or not objectionable interference has been detected at least from the detected RF energy, and a size of the neighborhood is determined by one of a manner of detecting the RF energy and the amount of detected RF energy.

22. The system of claim 19, in which the channels in the neighborhood have much less chance of being chosen than the remaining ones of the available channels.

23. The system of claim 19, in which the channels in the neighborhood have no chance of being chosen, and each of the remaining ones of the available channels has an approximately equal chance of being chosen.

24. The system of claim 19, in which some of the available channels outside the neighborhood have been used with lesser preference than others of the channels, and the second channel is chosen so as to further compensate for the lesser preference.

25. The system of claim 1, in which the operational processing block is further operable to:

detect one of the channels as an interferer's channel, and choose the second channel in such a way that a resulting tag backscatter avoids a center frequency of the interferer's channel.

26. The system of claim 25, in which a certain channel is detected as the interferer's channel if the certain channel has RF energy above a preset high threshold, while the RF energy in at least one of its neighboring channels are below a preset low threshold.

27. The system of claim 25, in which the second channel is chosen in a manner that disfavors all of the channels in a neighborhood of the interferer's channel.

28. The system of claim 25, in which the interferer's channel is chosen as the second channel.

29. A method for communicating with Radio Frequency Identification (RFID) tags and using a plurality of communication channels, comprising:

causing a first wireless signal to be transmitted to the RFID tags, the first wireless signal having a frequency carrier in a first one of the channels;

determining whether or not objectionable interference has been detected based on a reply from at least one RFID tag and RF energy received in at least one of the channels available for communicating with the RFID tags;

choosing a second one of the channels other than the first channel, the second channel being chosen in an unbiased manner if it is determined that no objectionable interference has been detected, the unbiased manner including not favoring any channel over another so as to avoid any interference, the second channel being alternately chosen in a biased manner different from the unbiased manner if it is determined that objectionable interference has been detected, the biased manner including disfavoring at least one channel over another in view of the detected interference; and causing a second signal to be transmitted to the RFID tags, the second signal having a frequency carrier in the second channel.

30. The method of claim 29, further comprising:

determining whether or not subsequent objectionable interference has been detected for communicating in the second channel;

choosing a third one of the channels other than the second channel, the third channel being chosen in the unbiased manner if it is determined that no subsequent objectionable interference has been detected, and in the biased manner if it is determined that subsequent objectionable interference has been detected; and causing a third signal to be transmitted to the RFID tags, the third signal having a frequency carrier in the third channel.

31. The method of claim 29, further comprising:

receiving tag signals from the RFID tags in response to the first signal; and in which it is determined whether or not objectionable interference has been detected at least from the tag signals.

32. The method of claim 31, in which a quality metric is computed in association with one of the received tag signals, and it is determined whether or not objectionable interference has been detected at least from the quality metric.

33. The method of claim 31, in which it is determined whether an error has been detected in one of the received tag signals, an error detection count is updated if it is determined that the error has been so detected, and it is determined whether or not objectionable interference has been detected at least from the error detection count.

34. The method of claim 29, further comprising:
receiving RF energy associated with transmitting in the first channel; and
in which it is determined whether or not objectionable interference has been detected at least from the received RF energy.

35. The method of claim 29, in which
the biased manner includes choosing the second channel in a manner that disfavors all of the channels in a neighborhood of the first channel.

36. The method of claim 29, further comprising:
detecting one of the channels as an interferer's channel, and
choosing the second channel in such a way that a resulting tag backscatter avoids a center frequency of the interferer's channel.

37. A machine-readable storage medium with instructions encoded thereon for operating a Radio Frequency Identification (RFID) reader system to communicate with RFID tags using a plurality of communication channels, the RFID reader system including at least one antenna, the instructions such that, if read and executed by the RFID reader system, actions result comprising:
causing a first wireless signal to be transmitted via the antenna of the RFID system to the RFID tags, the first wireless signal having a frequency carrier in a first one of the channels;
determining at a processor of the RFID reader system whether or not objectionable interference has been detected based on a reply from at least one RFID tag and RF energy received in at least one of the channels available for communicating with the RFID tags;
choosing at the processor of the RFID system a second one of the channels other than the first channel, the second channel being chosen in an unbiased manner if it is determined that no objectionable interference has been detected, the unbiased manner including not favoring any channel over another so as to avoid any interference, the second channel being alternately chosen in a biased manner different from the unbiased manner if it is determined that objectionable interference has been detected, the biased manner including disfavoring at least one channel over another in view of the detected interference; and
causing a second signal to be transmitted via the antenna of the RFID system to the RFID tags, the second signal having a frequency carrier in the second channel.

38. The medium of claim 37, in which the actions further comprise:
determining whether or not subsequent objectionable interference has been detected for communicating in the second channel;
choosing a third one of the channels other than the second channel, the third channel being chosen in the unbiased manner if it is determined that no subsequent objectionable interference has been detected, and in the biased manner if it is determined that subsequent objectionable interference has been detected; and
causing a third signal to be transmitted to the RFID tags, the third signal having a frequency carrier in the third channel.

39. The medium of claim 37, in which the actions further comprise:
receiving tag signals from the RFID tags in response to the first signal; and
in which it is determined whether or not objectionable interference has been detected at least from the tag signals.

40. The medium of claim 39, in which
a quality metric is computed in association with one of the received tag signals, and
it is determined whether or not objectionable interference has been detected at least from the quality metric.

41. The medium of claim 39, in which
a tag preamble matching metric is computed in association with one of the received tag signals, and
it is determined whether or not objectionable interference has been detected at least from the tag preamble matching metric.

42. The medium of claim 39, in which
it is determined whether an error has been detected in one of the received tag signals,
an error detection count is updated if it is determined that the error has been so detected, and
it is determined whether or not objectionable interference has been detected at least from the error detection count.

43. The medium of claim 37, in which the actions further comprise:
receiving RF energy associated with transmitting in the first channel; and
in which it is determined whether or not objectionable interference has been detected at least from the received RF energy.

44. The medium of claim 37, in which
the biased manner includes choosing the second channel in a manner that disfavors all of the channels in a neighborhood of the first channel.

45. The medium of claim 37, in which the actions further comprise:
detecting one of the channels as an interferer's channel, and
choosing the second channel in such a way that a resulting tag backscatter avoids a center frequency of the interferer's channel.

* * * * *

UNITED STATES PATENT AND TRADEMARK OFFICE
CERTIFICATE OF CORRECTION

PATENT NO. : 7,589,618 B2  Page 1 of 1
APPLICATION NO. : 11/849804
DATED : September 15, 2009
INVENTOR(S) : Christopher J. Diorio It is certified that error appears in the above-identified patent and that said Letters Patent is hereby corrected as shown below:

1) Please delete "interferer channel" in column 2 line 58 of the specification after "detected".

2) Please insert --to-- in column 2 line 58 of the specification after "according".

3) Please delete "Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet."
in column 8 lines 14–21 of the specification below "non-volatile."

4) Please delete "As mentioned above, at operation 550 it is determined whether or not objectionable interference has been detected. This determination can take place in any number of ways, for example using one or both of the tag signals received at operation 530, and the RF energy received at operation 540 if performed. Some examples are now described."
in column 10 lines 14–19 of the specification after "As mentioned above, ......... are now described."

Signed and Sealed this

Tenth Day of November, 2009

David J. Kappos
*Director of the United States Patent and Trademark Office*